United States Patent
Tanimura et al.

(10) Patent No.: US 8,447,190 B2
(45) Date of Patent: May 21, 2013

(54) DISTORTION COMPENSATING APPARATUS, OPTICAL RECEIVING APPARATUS, AND OPTICAL TRANSMITTING AND RECEIVING SYSTEM

(75) Inventors: Takahito Tanimura, Kawasaki (JP); Takeshi Hoshida, Kawasaki (JP); Hisao Nakashima, Kawasaki (JP); Kazunari Shiota, Fukuoka (JP); Kiichi Sugitani, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 328 days.

(21) Appl. No.: 12/697,202

(22) Filed: Jan. 29, 2010

(65) Prior Publication Data

US 2010/0196017 A1 Aug. 5, 2010

(30) Foreign Application Priority Data

Jan. 30, 2009 (JP) ................. 2009-020844

(51) Int. Cl.
| H04B 10/06 | (2006.01) |
| H04B 10/08 | (2006.01) |
| H04B 10/12 | (2006.01) |
| H04B 10/00 | (2006.01) |
| H04J 14/02 | (2006.01) |

(52) U.S. Cl.
USPC .............. 398/206; 398/29; 398/81; 398/147; 398/148; 398/159

(58) Field of Classification Search
USPC ..................... 375/232; 398/81, 159
See application file for complete search history.

(56) References Cited

U.S. PATENT DOCUMENTS

| 5,203,027 | A  * | 4/1993  | Nounin et al. ............... 455/134 |
| 5,617,450 | A  * | 4/1997  | Kakuishi et al. ............. 375/230 |
| 6,320,687 | B1 * | 11/2001 | Ishikawa ..................... 398/147 |
| 6,907,200 | B2 * | 6/2005  | Okuno ........................ 398/147 |
| 6,909,851 | B2 * | 6/2005  | Ishikawa ..................... 398/147 |
| 6,925,262 | B2 * | 8/2005  | Ooi et al. .................... 398/147 |
| 7,209,654 | B2 * | 4/2007  | Tanaka et al. ................. 398/29 |
| 7,376,361 | B2 * | 5/2008  | Miyauchi et al. ............. 398/208 |
| 7,542,677 | B2 * | 6/2009  | Sekiya et al. ................. 398/81 |

(Continued)

FOREIGN PATENT DOCUMENTS

| EP | 0541225 A1 | 5/1993 |
| EP | 1630982 A1 | 3/2006 |

(Continued)

OTHER PUBLICATIONS

Kim Roberts, Chuandong Li, Leo Strawezynski, Maurice O'Sullivan and Han Hardcastle; Electronic compensation of Optical Nonlinearity; Jan. 15, 2006; IEEE Photonics technology letters vol. 18 No. 2; pp. 403-405.*

(Continued)

*Primary Examiner* — Kenneth V Vanderpuye
*Assistant Examiner* — Amritbir Sandhu
(74) *Attorney, Agent, or Firm* — Fujitsu Patent Center

(57) ABSTRACT

A distortion compensating apparatus which compensates for distortion in a waveform of a received light signal through a digital signal processing includes a plurality of fixed amount compensators which compensate for the distortion in the waveform at respective given compensating amounts. The combination of operating states of the plurality of fixed amount compensators is changed by on/off switching of each of the plurality of fixed amount compensators, and the plurality of fixed amount compensators are cascaded.

12 Claims, 12 Drawing Sheets

U.S. PATENT DOCUMENTS

| | | | |
|---|---|---|---|
| 7,545,860 B2 * | 6/2009 | Gorecki | 375/232 |
| 7,701,842 B2 * | 4/2010 | Roberts et al. | 370/210 |
| 7,769,299 B2 * | 8/2010 | Ooi et al. | 398/147 |
| 8,326,160 B2 * | 12/2012 | Murakami et al. | 398/209 |
| 2001/0024306 A1 * | 9/2001 | Okuno | 359/161 |
| 2002/0003646 A1 * | 1/2002 | Ishikawa | 359/161 |
| 2002/0015207 A1 * | 2/2002 | Ooi et al. | 359/161 |
| 2003/0112496 A1 | 6/2003 | Van Schyndel | |
| 2003/0185568 A1 * | 10/2003 | Ooi et al. | 398/81 |
| 2004/0012334 A1 * | 1/2004 | Schutten et al. | 315/1 |
| 2004/0086276 A1 | 5/2004 | Lenosky et al. | |
| 2004/0165820 A1 * | 8/2004 | Okuno | 385/27 |
| 2005/0047792 A1 * | 3/2005 | Miyauchi et al. | 398/147 |
| 2005/0201454 A1 * | 9/2005 | Chaudhuri et al. | 375/229 |
| 2007/0014578 A1 * | 1/2007 | Miyauchi et al. | 398/147 |
| 2007/0147541 A1 * | 6/2007 | Saito | 375/297 |
| 2007/0177876 A1 * | 8/2007 | Ooi et al. | 398/147 |
| 2007/0177877 A1 * | 8/2007 | Sekine | 398/147 |
| 2008/0056726 A1 | 3/2008 | Sugiya et al. | |
| 2008/0198915 A1 * | 8/2008 | Gorecki | 375/232 |
| 2009/0034981 A1 * | 2/2009 | Kato | 398/136 |
| 2010/0111536 A1 * | 5/2010 | Ishii et al. | 398/81 |
| 2010/0196009 A1 * | 8/2010 | Qian et al. | 398/65 |
| 2011/0170881 A1 * | 7/2011 | Nakashima et al. | 398/209 |
| 2012/0128377 A1 * | 5/2012 | Hatae et al. | 398/208 |

FOREIGN PATENT DOCUMENTS

| | | |
|---|---|---|
| EP | 2157716 A1 | 2/2010 |
| EP | 2159936 A1 | 3/2010 |
| JP | 62-042608 | 2/1987 |
| JP | 4-362808 | 12/1992 |
| JP | H05-292033 | 5/1993 |
| JP | 6-164452 | 6/1994 |
| JP | 2008-245179 | 10/2008 |
| WO | WO 2007/045072 A1 | 4/2007 |
| WO | WO 2008/036356 A1 | 3/2008 |

OTHER PUBLICATIONS

B, Spinnler et al.,"Adaptive Equalizer Complexity in Coherent Optical Receivers",*ECOC 2008*, Brussels, Belgium, We.2.E.4, vol. 3, Sep. 21, 2008, 127-128.

D, McGhan "Electronic Dispersion Compensation",*OFC 2006, OWK1*, 2006 May 3, 2006.

Dany-Sebatien, Ly-Gagnon "Coherent Detection of Optical Quadrature Phase-Shift Keying Signals With Carrier Phase Estimation"*IEEE Journal of Lightwave Technology*, vol. 24, No. 1, Jan. 2006, 12-21.

F.N., Hauske et al.,"Optical Performance Monitoring From Fir Filter Coefficients in Coherent Receivers",*OFC/NFOEC 2008* Feb. 24, 2008.

G, Charlet et al.,"Transmission of 81 Channels At 40Gbit/s Over a Transpacific-Distance Erbium-Only Link, Using PDM-BPSK Modulation, Coherent Detection, and a New Large Effective Area Fibre",*ECOC 2008*, Brussels, Belgium, Th.3.E.3, vol. 7 Sep. 21, 2008, 29-30.

K, Kikuchi "Electronic Post-Compensation for Nonlinear Phase Fluctuations in a 1000-km 20-Gbit/s Optical Quadrature Phase-Shift Keying Transmission System Using the Digital Coherent Receiver",*Optics Express*, Jan. 21, 2008, vol. 16, No. 2, Jan. 21, 2008, 889-896.

Extended European Search Report dated May 27, 2010 for corresponding European Application No. 09179608.6.

Oscar et al, "A 90 nm CMOS DSP MLSD Transceiver With Integrated AFE for Electronic Dispersion Compensation of Multimode Optical Fibers at 10 Gb/s", IEEE Journal of Solid-State Circuits, vol. 43, No. 12, Dec. 1, 2008, pp. 2939-2957, XP011238669.

Japanese Office Action mailed Nov. 28, 2012 for corresponding Japanese Application No. 2009-020844, with English-language translation.

* cited by examiner

DISTORTION COMPENSATING APPARATUS, OPTICAL RECEIVING APPARATUS, AND OPTICAL TRANSMITTING AND RECEIVING SYSTEM

CROSS-REFERENCE TO RELATED APPLICATION

This application is based upon and claims the benefit of priority of the prior Japanese Application No. 2009-020844 filed on Jan. 30, 2009 in Japan, the entire contents of which are hereby incorporated by reference.

FIELD

The embodiment discussed herein is related to a distortion compensating apparatus, an optical receiving apparatus, and an optical transmitting and receiving system. The distortion compensating apparatus is one that compensates for distortion in a waveform of a light signal through digital processing.

BACKGROUND

One of the methods to realize large-capacity optical communication is to increase the optical transmission speed.

However, it is known that simple increase in the optical transmission speed result in generation of distortion in a waveform which distortion is caused by wavelength dispersion of the optical transmission path (e.g., an optical fiber). This restricts the optical transmission.

The speed of light propagating through an optical transmission path varies with the wavelength (frequency) of the light, and such a variation widens the pulse of light, which is called the effect of wavelength dispersion of an optical transmission path. When an optical transmission path has wavelength dispersion, the presence of a number of frequency components in a light pulse, which frequency components are different in transmission speed, causes transmission light to have distortion in a waveform depending of the dispersion amount (the product of dispersion and distance).

When such distortion in a waveform is not compensated for, the amount of dispersion tolerant in optical transmission has a limit value, which is in inverse proportion ratio to approximate square of transmission speed of a signal. That means the tolerant limit becomes smaller in accordance with increase in transmission speed. In other words, a higher transmission speed of a signal makes the optical transmission less possible.

For example, in the cases where the bit rate of a transmission signal is about 2.5 Gbps, the light pulse has a relatively narrow spectrum width and therefore the pulse width is small, which has a less possibility in generation of inter symbol interference unless ultra long-haul transmission.

However, in the cases where the bit rate (speed) of a transmission signal is 10 Gbps or 40 Gbps, the spectrum width of the light pulse is wide as compared with that of a transmission signal of 2.5 Gbps and therefore the same amount of dispersion results in a larger pulse width. In the above cases, the narrow distance between light pulses increases the possibility of the generation of a small pulse spread to generate inter symbol interference.

For the above, it is preferable that wavelength dispersion caused by an optical transmission line is compensated for in accordance with increase of the bit rate of a transmission signal to 2.5 Gbps, 10 Gbps, 40 Gbps, and 100 Gbps.

There have been known the techniques of the non-patent references 1 through 4 as exiting techniques of dispersion compensation.

For example, one of the known methods converts a modulated complex optical electric field into a digital signal and compensates for distortion caused by wavelength dispersion of signal light through digital complex-filter processing (see Non-patent reference 1 below).

In order to reduce the circuit scale of a distortion compensating circuit, another method teaches that signal light is converted from a time domain to a frequency domain and wavelength dispersion is compensated for in a frequency domain (see Non-Patent reference 2 below).

Further, there have been known a method of monitoring an amount of wavelength dispersion (see Non-Patent reference 3 below) and a method of compensating for non-linear distortion (see Non-Patent Reference 4).

Non-Patent Reference 1: G. Charlet et al., "Transmission of 81 channels at 40 Gbit/s over a Transpacific-Distance Erbium-only Link, using PDM-BPSK Modulation, Coherent Detection, and a new large effective area fibre." ECOC 2008, Brussels, Belgium, Sep. 21-25, 2008, TH.3.E.3, Vol. 7, p. 29-30

Non-Patent Reference 2: B. Spinnler et al., "Adaptive Equalizer Complexity in Coherent Optical Receivers], ECOC 2008, Brussels, Belgium, Sep. 21-25, 2008, We.2.E.4, Vol. 3, p. 127-128

Non-Patent Reference 3: F. N. Hauske et al., "Optical Performance Monitoring from FIR Filter Coefficients in Coherent Receivers", OFC/NFOEC 2008

Non-Patent Reference 4: Kazuo Kikuchi, "Electronic Post-compensation for Nonlinear Phase Fluctuations in a 1000-km 20-Gbit/s Optical Quadrature Phase-Shift Keying Transmission System Using the Digital Coherent Receiver" OPTICS EXPRESS, Jan. 21, 2008, Vol. 16, No. 2, p. 889-896

However, compensation for the above wavelength dispersion requires a long filter corresponding to a light signal received by the dispersion compensating apparatus. As a consequence, the hardware scale of the distortion compensating apparatus becomes large.

SUMMARY

According to an aspect of the embodiment, an apparatus includes a distortion compensating apparatus for compensating for distortion in a waveform of a received light signal through digital signal processing, the distortion compensating apparatus including a plurality of fixed amount compensators which compensate for the distortion in the waveform at respective given compensating amounts, wherein a combination of operating states of the plurality of fixed amount compensators is changed by on/off switching of each of the plurality of fixed amount compensators, and the plurality of fixed amount compensators are cascaded.

According to an aspect of the embodiment, an apparatus includes an optical receiving apparatus including the above dispersion compensating apparatus.

According to an aspect of the embodiment, an apparatus includes an optical transmitting and receiving system including the above dispersion compensating apparatus.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Hereinafter, exemplary embodiments will be described with reference to accompanying drawings. The following exemplary embodiments are merely examples and do not intend to exclude various modifications and variations to the proposed method and/or apparatus that are not specifically described herein. Rather, various modifications or variations may be made to the embodiments (for example, by combining the exemplary embodiments) without departing from the scope and spirit of the proposed method and/or apparatus.

[1] First Embodiment

Figure 1:
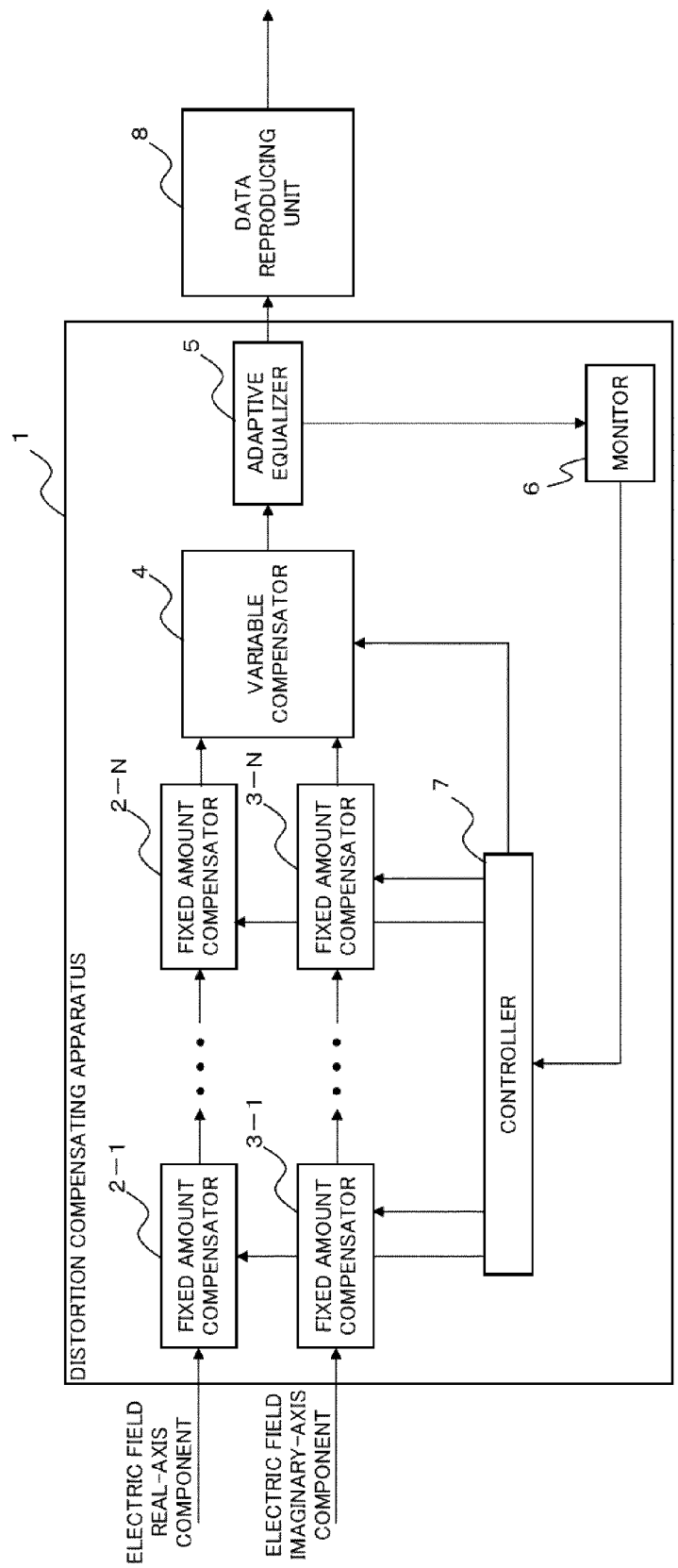
FIG. 1 is a block diagram schematically illustrating an example of the configuration of a distortion compensating apparatus according to a first embodiment.

FIG. 1 is a block diagram schematically illustrating an example of the configuration of a distortion compensating apparatus according to the first embodiment.

A distortion compensating apparatus 1 depicted in FIG. 1 exemplarily includes fixed amount compensators 2-1 through 2-N (where N is a natural number) and 3-1 through 3-N, a variable compensator 4, an adaptive equalizer 5, a monitor 6, and a controller 7. The fixed amount compensators 2-1 through 2-N and the fixed amount compensators 3-1 through 3-N are simply called the fixed amount compensators 2 and the fixed amount compensator 3 when there is no requirement to discriminate one from the others. The first embodiment is described on the assumption that distortion in a waveform of a light signal which distortion is caused by wavelength dispersion of the light signal is to be compensated for. However, the present invention should by no means be limited to this assumption.

Here, the fixed amount compensators 2 compensate for wavelength dispersion of the electric field real-axis component (e.g., the I-axis component in digital modulation) of a light signal input from an optical transmission path (not-illustrated) at respective fixed dispersion compensating amounts through digital signal processing.

The fixed amount compensators 2-1 through 2-N are cascaded. An electric field real-axis component compensated for by a fixed amount compensator 2-M (where M=1, . . . , N−1) is output to the downstream fixed amount compensator 2-(M+1), and the electric field real-axis component compensated for by the fixed amount compensator 2-N is output to the variable compensator 4.

The fixed amount compensators 3 compensate for wavelength dispersion of the electric field imaginary-axis component (e.g., the Q-axis component in digital modulation) of the light signal input from the optical transmission path at respective fixed dispersion compensating amounts through digital signal processing.

Similarly to the fixed amount compensators 2-1 through 2-N, the fixed amount compensators 3-1 through 3-N are cascaded. An electric field imaginary-axis component compensated for by a fixed amount compensator 3-M is output to the downstream fixed amount compensator 3-(M+1), and the electric field imaginary-axis component compensated for by the fixed amount compensator 3-N is output to the variable compensator 4.

Here, the dispersion compensating amounts of the respective fixed amount compensators 2-1 through 2-N may be the same, may be partially different, or may different from one another, and similarly those of the fixed amount compensators 3-1 through 3-N may be the same, may be partially different, or may different from one another.

The operation states of fixed amount compensators 2 and 3 are individually on/off switching controlled. Such on/off switching may be controlled by the controller 7 that is to be detailed below.

In other words, the fixed amount compensators 2 and 3 function as an example of a number of fixed amount compensators which compensate for distortion in a waveform of a light signal that the distortion compensating apparatus 1 has received at respective fixed compensating amounts and the combination of operating states of which can be changed by on/off switching.

The variable compensator 4 compensates for wavelength dispersion of the electric field real-axis component and the electric field imaginary-axis component respectively input from fixed amount compensators 2-N and 3-N at variable dispersion compensating amounts through digital signal processing. The signal compensated for by the variable compensator 4 is output to the adaptive equalizer 5.

The variable compensator 4 is cascaded with the fixed amount compensators 2 and 3, and is capable of compensating for the remaining wavelength dispersion in the light signal that the distortion compensating apparatus 1 has received after the compensation performed by the fixed amount compensators 2 and 3. The dispersion compensating amount at which the variable compensator 4 compensates for wavelength dispersion may be controlled by, for example, the controller 7 to be detailed below.

Here, the fixed amount compensators 2 and 3, and the variable compensator 4 each include a digital filter 22. Alternatively, each set of the fixed amount compensators 2-1 and 3-1, . . . , and the fixed amount compensators 2-N and 3-N may be a common single form. In such a configuration, the digital filters 22 may be Finite Impulse Response filters (e.g., complex FIR (Finite Impulse Response) filters) as depicted in the example FIG. 2. However, the digital filters 22 of the present example should by no means be limited to FIR filters, but may be alternatively Infinite Impulse Response Filters (e.g., complex IIR (Infinite Impulse Response) filters). The digital filter 22 illustrated in the example FIG. 2 has the tap number of three, but the tap number of a filter should by no means be limited to three.

Figure 2:
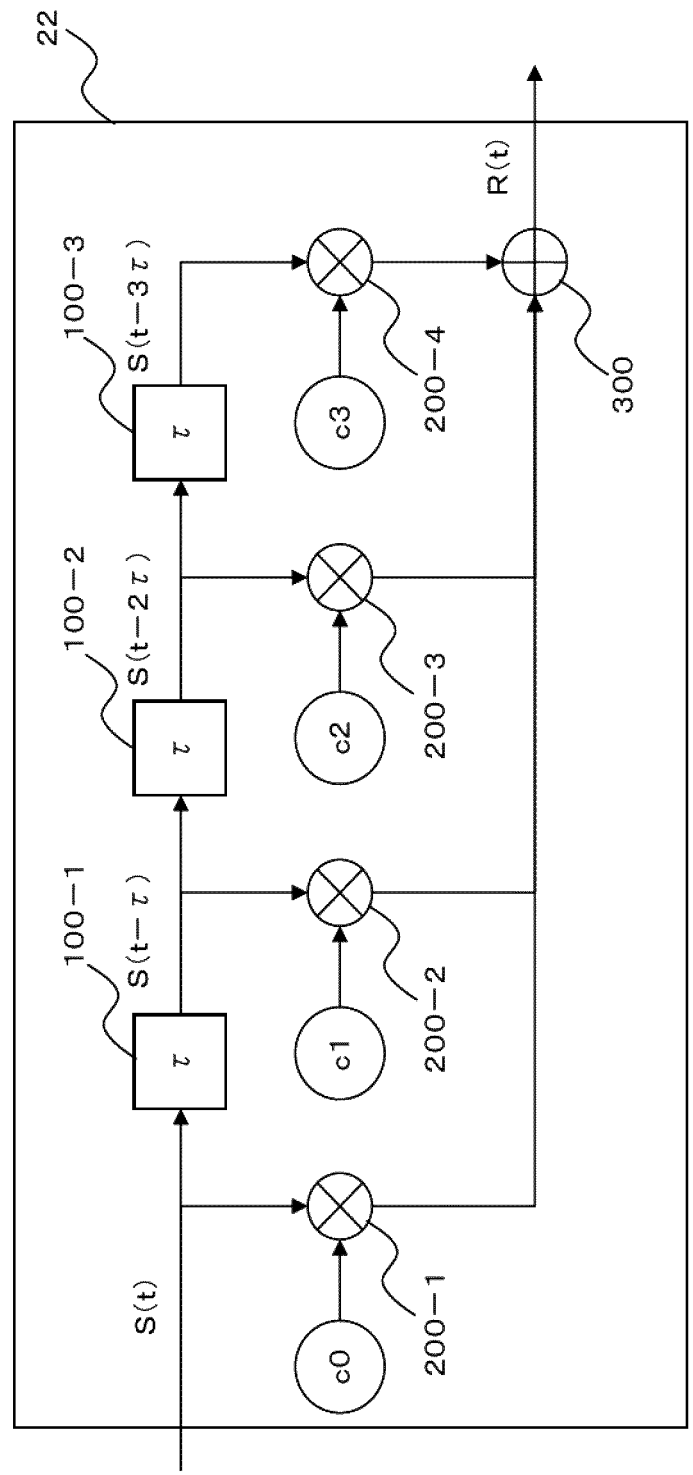
FIG. 2 is a block diagram schematically illustrating an example of a digital filter.

The digital filter 22 illustrated in FIG. 2 exemplarily includes delay circuits 100-1 through 100-3, multiplexers 200-1 through 200-4, and an adder 300. The delay circuits 100-1 through 100-3 are sometimes represented by reference number 100 when there is no requirement to discriminated one from the others, and similarly, the multiplexers 200-1 through 200-4 are sometimes represented by reference number 200 when there is no requirement one from the others.

A delay circuit 100 provides a given delay (e.g., $\tau$) to an input signal. In the example of FIG. 2, the delay circuit 100-1 provides a delay time $\tau$ to an input signal $S(t)$ and outputs the resultant signal $S(t-\tau)$; the delay circuit 100-2 provides a delay time $\tau$ to the output signal $S(t-\tau)$ from the delay circuit 100-1 and outputs the resultant signal $S(t-2\tau)$; and the delay circuit 100-3 provides a delay time $\tau$ to the output signal $S(t-2\tau)$ from the delay circuit 100-2 and outputs the resultant signal $S(t-3\tau)$.

A multiplexer 200 multiplies an input signal and a coefficient pattern (a filter coefficient (e.g., c0 through c3)). In the example of FIG. 2, the multiplexer 200-1 multiplexes the input signal $S(t)$ and the filter coefficient c0, and the multiplication result is output to the adder 300; the multiplexer 200-2 multiplexes the output signal $S(t-\tau)$ from the delay circuit 100-1 and the filter coefficient c1, and the multiplication result is output to the adder 300; the multiplexer 200-3 multiplexes the output signal $S(t-2\tau)$ from the delay circuit 100-2 and the filter coefficient c2, and the multiplication result is output to the adder 300; and the multiplexer 200-4 multiplexes the output signal $S(t-3\tau)$ from the delay circuit 100-3 and the filter coefficient c3, and the multiplication result is output to the adder 300.

The adder 300 adds the output signals from the multiplexers 200-1 through 200-4, and then outputs an output signal $R(t)$ representing the result of the addition.

Figure 3:
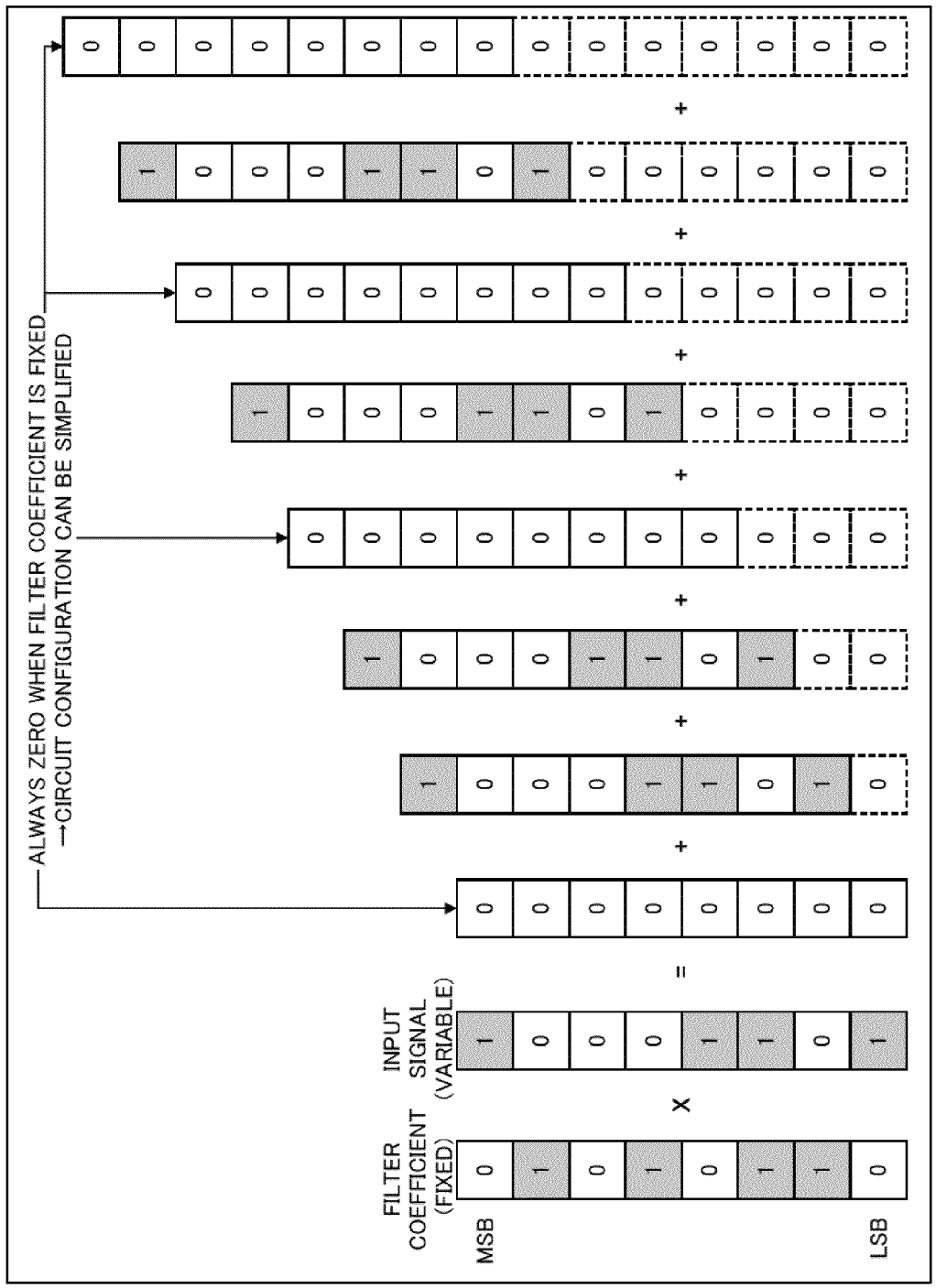
FIG. 3 is a diagram depicting an example of a method of simplifying the circuit configuration of the digital filter of FIG. 2.

Here, as denoted in the example of FIG. 3, when a fixed filter coefficient ("01101010") and a variable input signal ("10110001") are to be multiplied, the filter of FIG. 2 multiplies the input signal by the respective bit values of the filter coefficient from the LSB (Least Significant Bit) to the MSB (Most Significant Bit), adds the results of the multiplications depending on the bit positions of the filter coefficient, and outputs the result of the addition.

Specifically, in the example of FIG. 3, the result "00000000" of multiplication of the LSB of the fixed filter coefficient and the variable input signal, the result "10110001" of multiplication of the second bit of the fixed filter coefficient and the variable input signal, the result "10110001" of multiplication of the third bit of the fixed filter coefficient and the variable input signal, the result "00000000" of multiplication of the fourth bit of the fixed filter coefficient and the variable input signal, the result "10110001" of multiplication of the fifth bit of the fixed filter coefficient and the variable input signal, the result "00000000" of multiplication of the sixth bit of the fixed filter coefficient and the variable input signal, the result "10110001" of multiplication of the seventh bit of the fixed filter coefficient and the variable input signal, and the result "00000000" of multiplication of the MSB of the fixed filter coefficient and the variable input signal are added depending on each bit position (digit).

In the above calculation, calculating performed on the bit value "0" of the filter coefficient can be omitted, so that the circuit to carry out the corresponding calculating can be omitted. For example, when a filter coefficient is fixed and partially includes the bit of "0", the results of the multiplication always include at least one bit string of "0" and therefore the circuit configuration corresponding to the bit string can be simplified. As a consequence, the hardware scale of the distortion compensating apparatus 1 can be reduced.

When the filter coefficients are fixed, the patterns (kinds) of filter coefficient can be less in number than the variable filter coefficients, and accordingly the number of wirings can be reduced in the digital filters. In other words, since a digital filter having fixed filter coefficients has coefficient patterns less in kind than coefficient patterns possessed by a digital filter whose filter coefficients are variable, and can therefore make the filter circuit thereof small in size. In addition, the combination of filter coefficients of the fixed amount compensators 2 and 3 may be selected so as to more simplify the filter circuits (i.e., a combination including a relatively large number of bit values "0").

Here, the adaptive equalizer 5 compensates for the optical transmission path through adaptive equalizing processing (e.g., compensation for gain and/or phase) on the output signal from the variable compensator 4 in the time domain. In other words, the adaptive equalizer 5 can compensate for wavelength dispersion remaining despite the compensation in the fixed amount compensators 2 and 3 and the variable compensator 4. The signal subjected to equalizing processing by the adaptive equalizer 5 is then output to the monitor 6 and the data reproducing unit 8.

The data reproducing unit 8 reproduces data through given demodulating and decoding processing on a digital signal which has been subjected to equalizing processing in the adaptive equalizer 5, and outputs the reproduced data.

The monitor 6 measures a residual amount of wavelength dispersion (residual dispersion) remaining in the output signal from the adaptive equalizer 5. For example, the monitor 6 measures the wavelength dispersion (residual dispersion) that has not been compensated for by the fixed amount compensators 2 and 3, the variable compensator 4, and the adaptive equalizer 5, and outputs the result of the measurement to the controller 7.

The controller 7 changes a combination of operating states of the fixed amount compensators 2 and 3 on the basis of distortion in the waveform caused by the optical transmission path through which the light signal propagates. For example, the controller 7 controls on/off switching of the operation of each of the fixed amount compensators 2 and 3 such that the total compensating amount to be compensated for by switched-on fixed amount compensators 2 and 3 becomes the closest to the amount of wavelength dispersion in the received light signal.

Figure 4:
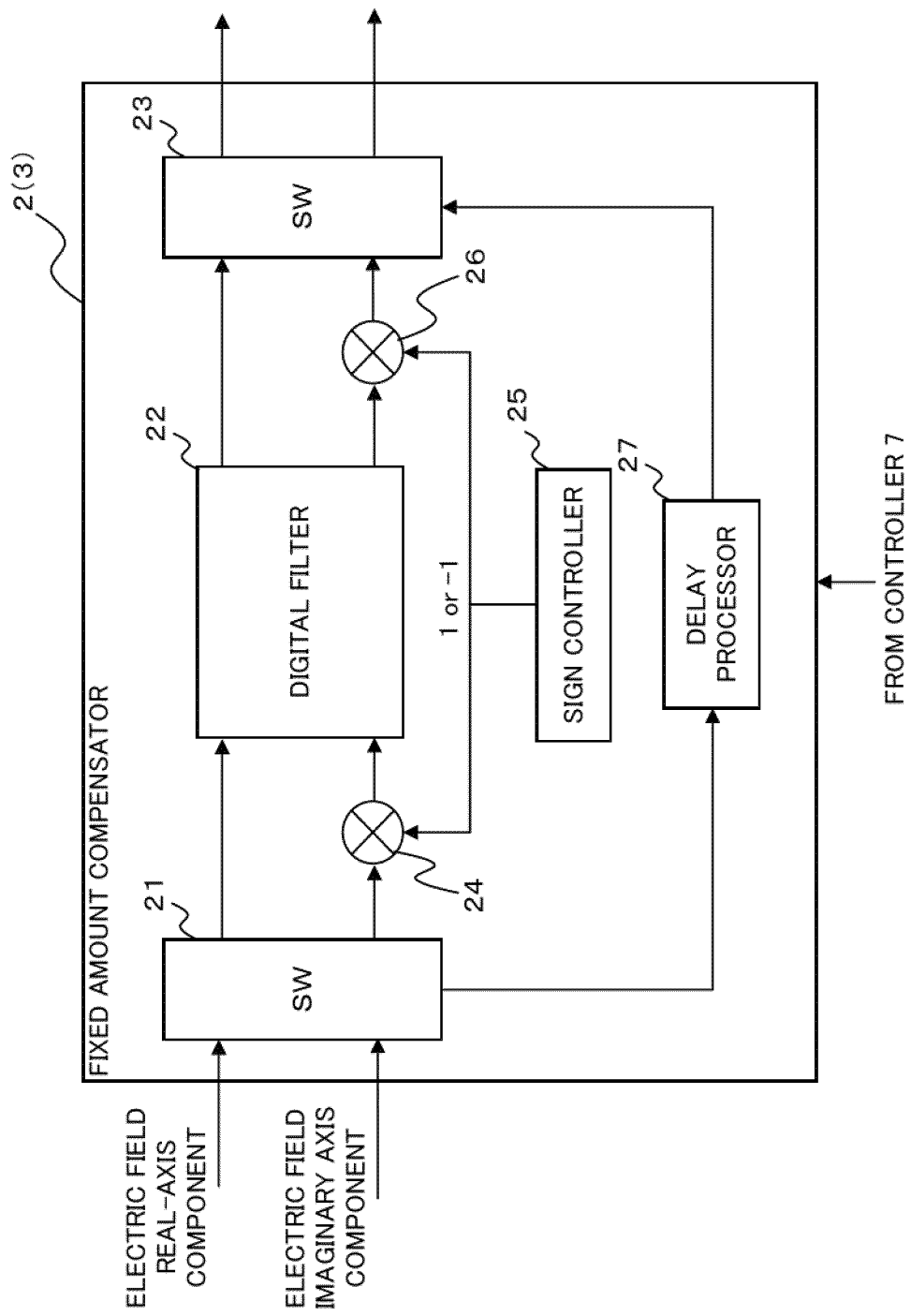
FIG. 4 is a block diagram illustrating an example of a fixed amount compensator of FIG. 1.

As illustrated in FIG. 4, a fixed amount compensator 2 (3) includes, for example, an input-end switch (SW) 21, a digital filter 22, an output-end switch (SW) 23, multiplexers 24 and 26, a sign controller 25, and a delay processor 27. In the example illustrated in FIG. 4, the fixed amount compensators 2 and 3 are formed into a single common form.

The input-end switch 21 switches between a route to the digital filter 22 and a rout to the delay processor 27 and outputs an input electric field real-axis component and an input electric field imaginary-axis component to a switched route.

The digital filter 22 multiplies an input component and a fixed filter coefficient, adds the results of the multiplication, and outputs the result of the addition. Namely, the digital filter 22 functions as an exemplary digital filter which regards one of the outputs from the input-end switch 21 as an input therein and which compensates for distortion in the waveform of alight signal at a fixed compensating amount.

The output-end switch 23 selectively switches between an input from the digital filter 22 and an input from the delay processor 27 and outputs the selected input to the output end of the fixed amount compensator 2 (3).

The multiplexer 24 multiplies an electric field imaginary-axis component from the input-end switch 21 and a control signal from the sign controller 25, and outputs the result of the multiplication to the digital filter 22.

The multiplexer 26 multiplies a compensated electric field imaginary-axis component from the digital filter 22 and a control signal from the sign controller 25, and outputs the result of the multiplication to the output-end switch 23.

The sign controller 25 inverts the plus and the minus of the dispersion compensating amount of the fixed amount compensator 2 (3) under the control of the controller 7. For example, when the fixed compensating amount of the fixed amount compensator 2 (3), including the sign controller 25, is a plus value, the sign controller 25 outputs the digit "1" to the multiplexer 24 and the multiplexer 26. Conversely, when the fixed compensating amount is a minus value, the sign controller 25 outputs the digit "−1" to the multiplexer 24 and the multiplexer 26.

In other words, when the fixed compensating amount of the fixed amount compensator 2 (3) is a plus value, the sign controller 25 included in the same fixed amount compensator 2 (3) keeps the sign of an imaginary component of a complex signal input into and output from the fixed amount compensator 2 (3) unchanged in the illustrated embodiment. On the other hand, when the fixed compensating amount is a minus value, the sign controller 25 inverts the sign of the imaginary component.

Here, the method of inverting a sign will now be detailed.

Assuming that the input signal is $S=s1+s2i$ (where, i is an imaginary number) and the filter coefficient is $C=c1+c2i$, the plus compensation is calculated as $Rp=S \times C=(c1s1-c2s2)+(c1s2+c2s1)i$.

In contrast, the minus compensation of the input signal S and the filter coefficient C is calculated as $Rm=S \times C^*=(s1+s2i) \times (c1-c2i)=(c1s1+c2s2)+(c1s2-c2s1)i$. Here, the symbol "*" represents the conjugated complex number.

For example, multiplication of the filter coefficient C and the complex conjugate $S^*$ of the input signal S results in $S^* \times C=(c1s1+c2s2)-(c1s2-c2s1)i=Rm^*$. Accordingly, inversion of the sign of the imaginary part of $Rm^*$ can obtain the minus compensate Rm not requiring the complex conjugate of the filter coefficient.

In this embodiment, when the sign of the dispersion compensating amount of the fixed amount compensator 2 (3) is to be inverted, the sign controller 25 inverts the sign of the electric field imaginary-axis component that is to input into the digital filter 22 and the sign of the compensated electric-field imaginary-axis component output from the digital filter 22.

This configuration allows the digital filter 22 to obtain two kinds (plus and minus) of dispersion compensating amount from each individual filter coefficient.

The delay processor 27 introduces delay into an electric field real-axis component and an electric field imaginary-axis component from the input-end switch 21, and outputs the delayed components to the output-end switch 23. Namely, the delay processor 27 of the illustrated example functions as an exemplary delay processor that receives the other output from the input-end switch 21 as the input therein and that performs delay processing on the input.

The fixed amount compensator 2 (3) having the above configuration selectively switches an output destination from the input-end switch 21 and an input source into the output-end switch 23 under on/off switching control of the controller 7. For example, when the fixed amount compensator 2 (3) is switched on, the controller 7 switches the input-end switch 21 and the output-end switch 23 such that the result of processing at the digital filter 22 is output. On the other hand, when the fixed amount compensator 2 (3) is switched off, the controller 7 switches the input-end switch 21 and the output-end switch 23 such that the result of processing at the delay processor 27 is output.

That makes the fixed amount compensator 2(3) of the illustrated example to on/off switch its operating state under the on/off switching control of the controller 7. While the operation of the fixed amount compensator 2(3) is switched off, the power consumption can be saved by cutting off the power supply to the digital filter 22.

For example, the mechanism for the on/off switching may be disposed at the exterior of the fixed amount compensator 2 (3).

Figure 5:
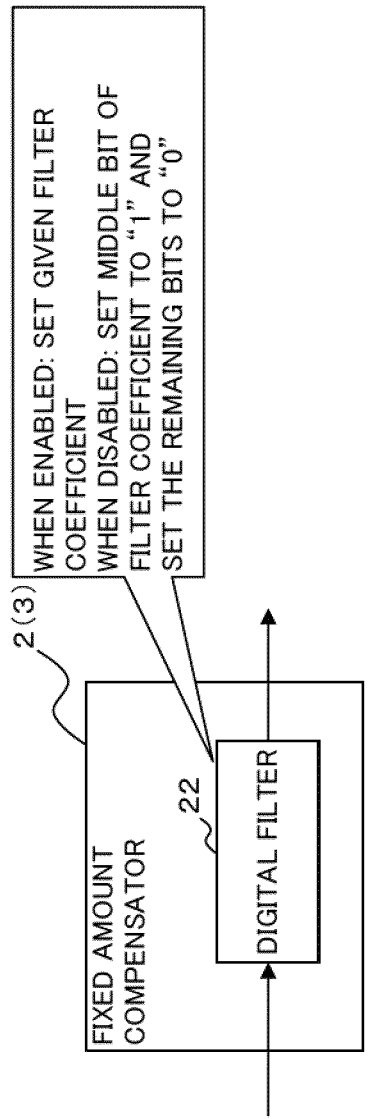
FIG. 5 is a block diagram illustrating another example of a fixed amount compensator of FIG. 1.

Further, the fixed amount compensator 2 (3) can switch the on/off of its operation state with the configuration illustrated in the example of FIG. 5.

As illustrated in FIG. 5, when the fixed amount compensator 2 (3) is switched on, for example, the controller 7 sets the filter coefficient of the digital filter 22 to a given value. In the meantime, when the fixed amount compensator 2 (3) is switched off, the controller 7 sets the filter coefficient of the digital filter 22 to a coefficient pattern (a filter coefficient) which makes the same fixed amount compensator 2 (3) switched off. For example, the middle bit of the filter coefficient of the digital filter 22 is set to be "1" and the remaining bits are set to be "0".

The same function as that of the delay processor 27 depicted in FIG. 4 is realized by setting only one bit of the filter coefficient to be "1" and setting the remaining bit to be "0". That makes it possible to further reduce the hardware scale of the fixed amount compensator 2(3).

The controller 7 variably controls the compensating amount of the variable compensator 4 on the basis of the distortion in the wavelength of the signal light and the compensating amounts of the fixed amount compensators 2 and 3. For example, the controller 7 controls the variable compensating amount of the variable compensator 4 such that the amount of wavelength dispersion remaining after the compensation in the fixed amount compensators 2 and 3 can be compensated for. In other words, the controller 7 variably controls the compensating amount of the variable compensator 4 in order to compensate for wavelength dispersion remaining after the processing by the adaptive equalizer 5. For example, the controller 7 can determine the amount of dispersion compensated for in the variable compensator 4 to be the amount equal to the difference obtained by subtracting the total amount of compensating by the fixed amount compensators 2 and 3 from the amount of wavelength dispersion caused by the optical transmission path.

Further, the controller 7 may control on/off switching of the operation states of each of the fixed amount compensators 2 and 3 and variably control the compensating amount of the variable compensator 4 such that a given amount of wavelength dispersion is compensated for, or may carryout the above control on the basis of the result of measurement by the monitor 6.

Thereby, the controller 7 can control the fixed amount compensators 2 and 3 and the variable compensator 4 such that an amount of wavelength dispersion given by the user is compensated for at the beginning of the communication, and when the wavelength dispersion varies during the communication, can control the compensation so as to keep up with the variation in the wavelength dispersion.

Next, description will now be made in relation to an example of the operation performed by the distortion compensating apparatus 1 having the above configuration.

Figure 6:
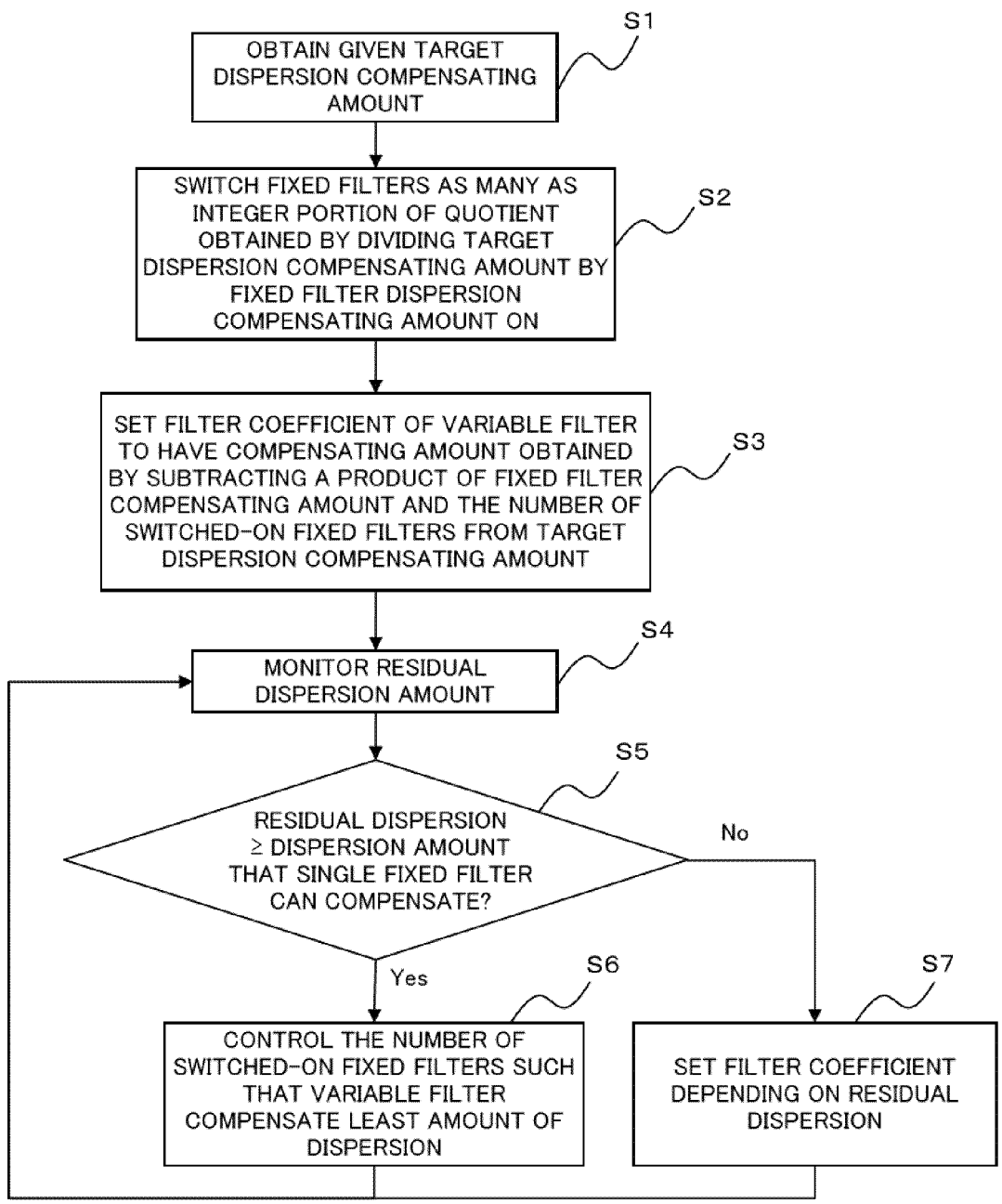
FIG. 6 is a flow diagram denoting a succession of procedural steps performed by the distortion compensating apparatus of FIG. 1.
Figure 7:
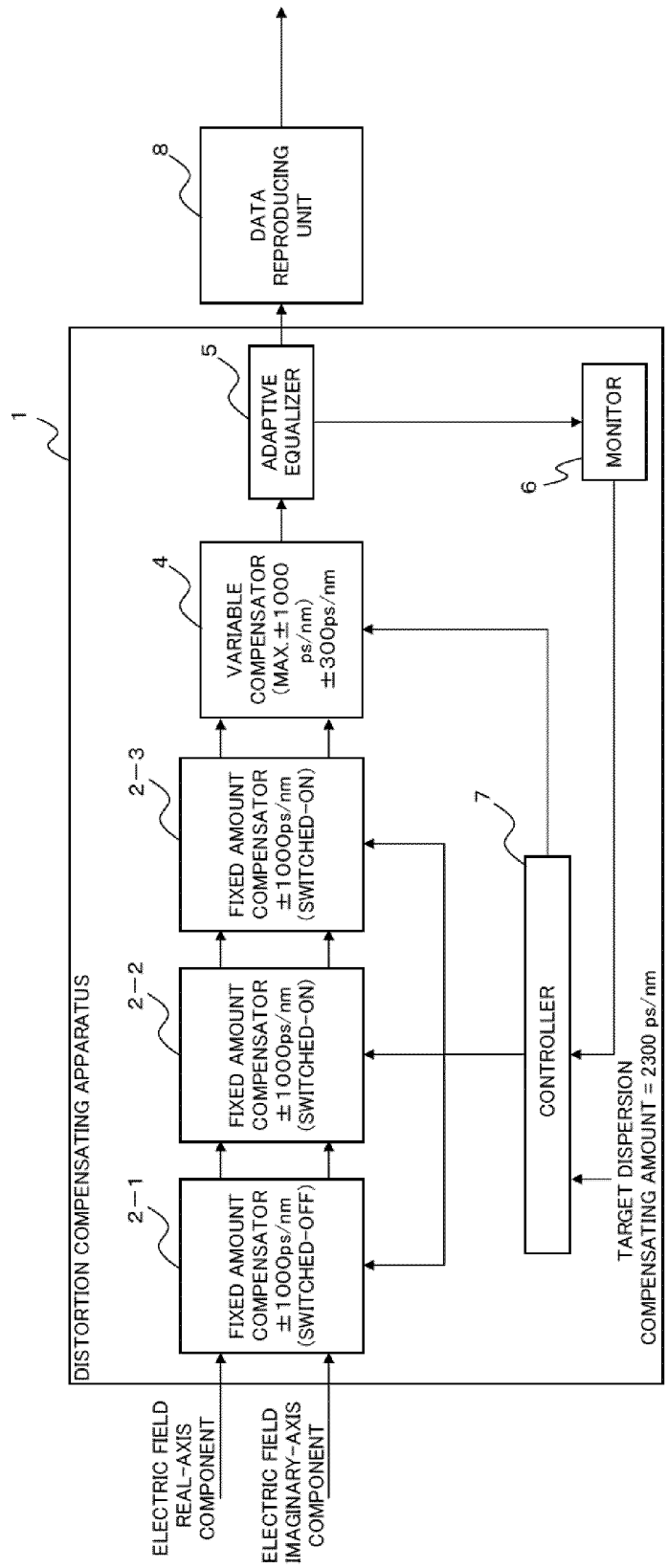
FIG. 7 is a block diagram schematically illustrating an example of the configuration of the distortion compensating apparatus of FIG. 1.

FIG. 6 is a flow diagram denoting an example of a succession of procedural steps performed by the distortion compensating apparatus 1. FIG. 7 is a block diagram schematically illustrating an example of the configuration of the distortion compensating apparatus 1 of the illustrated example. The example of FIG. 7 assumes that: the distortion compensating apparatus 1 includes N(=3) fixed amount compensators 2 and N (=3) fixed amount compensator 3, each pair of a fixed amount compensator 2 and a fixed amount compensator 3 being configured to an integrated common form; each of the fixed amount compensators 2-1 through 2-3 has fixed compensating amounts of ±1000 ps/nm; and the variable compensator 4 has a dispersion compensating amount which is variable in the range of from −1000 ps/nm to +1000 ps/nm. The compensating amounts of the fixed amount compensators 2-1 through 2-3 and the variable compensator 4 are not limited to those in this example, and therefore the dispersion compensating amounts of the fixed amount compensators 2-1 through 2-3 may be different one from the others.

First of all, the distortion compensating apparatus 1 of this example obtains a dispersion compensating amount (target dispersion compensating amount) given by the user and other (step S1) as denoted in FIG. 6. In the example of FIG. 7, the target dispersion compensating amount is set to be 2300 ps/nm. The unit "ps" represents an amount of width of the light pulse and the unit "nm" represents a width of spectrum of a light signal.

Next, the controller 7 switches one or more fixed amount compensators 2 as many as the quotient (integer) obtained by dividing the target dispersion compensating amount by the dispersion compensating amount (fixed filter dispersion amount) of the fixed amount compensators 2 on and switches the remaining fixed amount compensators 2 off (step S2). In the example of FIG. 7, the division results in 2300 ps/nm÷1000 ps/nm=2.3 and therefore the number of two that is the maximum integer below 2.3 is the number of fixed amount compensators 2 that are to be switched on. As a consequence, in the example of FIG. 7, two fixed amount compensators 2-2 and 2-3 are switched on and the single remaining fixed amount compensator 2-1 is switched off. The position of fixed amount compensators 2 that are to be switched on (or switched off) are not limited to the above example.

In the cases where fixed amount compensators 2 have respective different dispersion compensating amounts, the controller 7 may control on/off switching of each fixed amount compensator 2 such that the total dispersion compensating amount of one or more switched-on fixed amount compensators 2 becomes the closest to but dose not exceed the target dispersion compensating amount.

Next, the controller 7 variably controls the filter coefficient of the digital filter possessed by the variable compensator 4 such that the dispersion compensating amount of the variable compensator (variable filter) 4 is difference obtained by subtracting the product of compensating amount of a single fixed amount compensator (fixed filter) 2 and the number of switched-on fixed amount compensators 2 from the target dispersion amount (step S3). In the example of FIG. 7, the subtraction results in 2300 ps/nm−(1000 ps/nm×2)=300 ps/nm and therefore the controller 7 controls the dispersion amount of the variable compensator 4 to be 300 ps/nm. Through the procedure, the fixed amount compensators 2 and the variable compensator 4 can compensate for wavelength dispersion as much as the target dispersion compensating amount given.

The signal whose dispersion has been compensated for by fixed amount compensators 2 and the variable compensator 4 is subjected to equalizing processing in the adaptive equalizer 5 and is further measured for a residual dispersion amount by the monitor 6 (step S4).

The result of the measurement by the monitor 6 is output to the controller 7, which determines whether or not the amount of the measured residual dispersion can be compensated for by a signal fixed amount compensator 2 (i.e., the amount is 1000 ps/nm in the example of FIG. 7) or more (step S5).

Here, when the amount of the residual dispersion is an amount of dispersion that can be compensated for by a single fixed amount compensator 2 or more (Yes route of step S5), the controller 7 changes the number of switched-on fixed amount compensators 2 such that the amount of dispersion to be compensated for by the variable compensator 4 becomes the minimum (step S6). For example, assuming that the residual dispersion is 1200 ps/nm, the controller 7 can further switch the fixed amount compensator 2-1 on and concurrently change the dispersion compensating amount of the variable compensator 4 to be 500 ps/nm. Further, assuming the residual dispersion is −1100 ps/nm, the controller 7 can switch the fixed amount compensator 2-2 or 2-3 off and change the dispersion compensating amount of the variable compensator 4 to be 200 ps/nm.

Further, when the sum of the amount of the residual dispersion and the dispersion compensating amount set in the variable compensator 4 is the fixed dispersion compensating amount of a single fixed amount compensator 2 or more, the controller 7 may change the number of switched-on fixed amount compensators 2 such that the amount of dispersion to be compensated for by the variable compensator 4 becomes the minimum. Assuming that the residual dispersion is 800 ps/nm, the sum of the amount of the residual dispersion and the dispersion compensating amount (300 ps/nm) of the variable compensator 4 is 1100 ps/nm, which is larger than a dispersion amount (1000 ps/nm) that a single fixed amount compensator 2 can compensated for. In this case, the controller 7 may further switch the remaining fixed amount compensator 2-1 on and change the dispersion compensating amount of the variable compensator 4 to 100 ps/nm.

Conversely, when the amount of the residual dispersion is less than an amount of dispersion that can be compensated for by a single fixed amount compensator 2 (No route of step S5), the controller 7 changes the dispersion compensating amount of the variable compensator 4 depending on the amount of the residual dispersion (step S7). For example, assuming that the amount of residual dispersion is 200 ps/nm, the controller 7 can change the dispersion compensating amount of the variable compensator 4 from 300 nm/ps to 500 ps/nm without changing the number of switched-on fixed amount compensator 2.

The controller 7 may carry out control to change the number of switched-on fixed amount compensators 2 on the basis of the amount of residual dispersion and the dispersion compensating amount set in the variable compensator 4. Assuming the residual dispersion is −400 ps/nm, the controller 7 may switch the fixed amount compensator 2-2 or 2-3 off and concurrently change the dispersion compensating amount of the variable compensator 4 to 900 ps/nm.

As described above, the distortion compensating apparatus 1 of this example flexibly compensates for distortion (e.g., wavelength distortion) in waveform of a light signal through adaptive on/off switching the fixed filters (i.e., the fixed amount compensators 2 and 3) smaller in circuit scale than a variable filter. It is therefore possible to reduce the hardware scale of the distortion compensating apparatus 1.

Control that switches a fixed filter that is not being used off can save the electricity consumption. Further, the distortion compensating apparatus 1 of the illustrated example may omit the variable compensator 4. In this case, the distortion compensating apparatus 1 can compensate for a target dispersion compensating amount by controlling the combination of operating states of a number of fixed amount compensators 2 (3).

Here, description will now be made in relation to an example of an optical transmitting and receiving system including the above distortion compensating apparatus 1 with reference to FIGS. 8 and 9.

Figure 8:
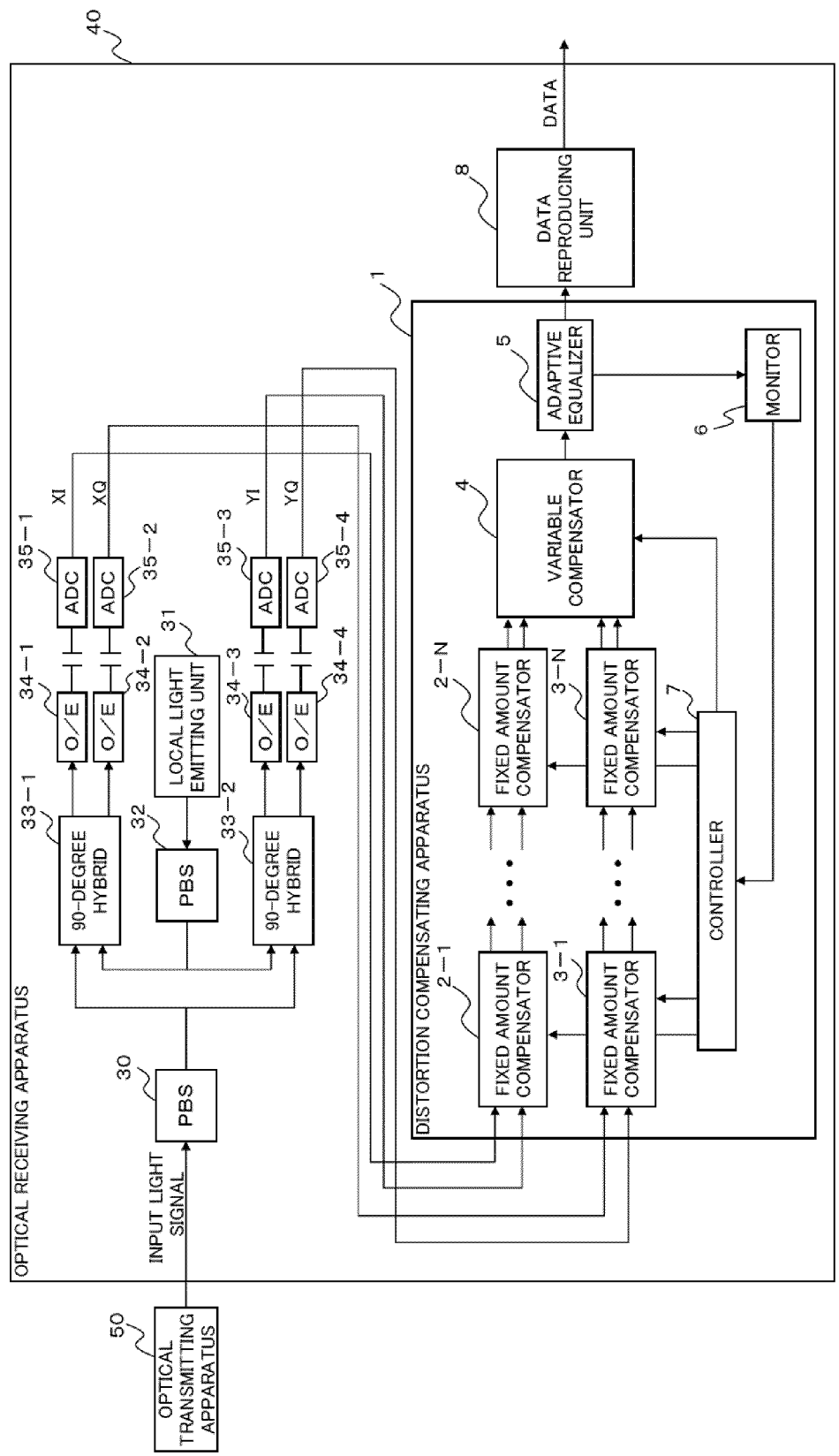
FIG. 8 is a block diagram schematically illustrating an example of an optical transmitting and receiving system including the distortion compensating apparatus of FIG. 1.

The optical transmitting and receiving system of FIG. 8 exemplarily includes an optical transmitting apparatus 50 and an optical receiving apparatus 40. The optical receiving apparatus 40 exemplarily includes a PBS (Polarizing Beam Splitter) 30, a local light emitting unit 31, a PBS 32, 90-degree hybrids 33-1 and 33-2, O/Es (optical/electrical converters) 34-1 through 34-4, ADCs (Analog-to-Digital Converters) 35-1 through 35-4, and the distortion compensating apparatus 1. A 90-degree hybrid is represented by the reference number 33 when the 90-degree hybrids 33-1 and 33-2 are not discriminated from each other. Similarly, an O/E and is represented by the reference number 34 when the O/Es 34-1 through 34-4 are not discriminated one from the others; and an ADC is represented by the reference number 35 when the ADCs 35-1 through 35-4 are not discriminated one from the others.

The PBS 30 divides an input signal light input from the optical transmitting apparatus 50 through the optical transmission path into the X polarization and the Y polarization that are orthogonal to each other. The X-polarized light by the PBS 30 is output to the 90-degree hybrid 33-1 and the Y-polarized light obtained through the division by the PBS 30 is output to the 90-degree hybrid 33-2.

The local light emitting unit 31 is semiconductor laser that oscillates at the same frequency as or a different frequency from that of the input signal light. The light locally emitted from the local light emitting unit 31 is output to the PBS 32.

The PBS 32 is exemplified by an optical branching filter that maintains a plane of polarization and bifurcates the locally emitted light from the local light emitting unit 31. The bifurcated light components from the PBS 32 are output one to each of the 90-degree hybrids 33-1 and 33-2.

The 90-degree hybrid 33-1 causes the X-polarized divided light input from the PBS 30 and one of the bifurcated light components input from PBS 32 to have a phase difference of 90 degrees and outputs the X polarization and the bifurcated light component to the O/Es 34-1 and 34-2.

Similarly, the 90-degree hybrid 33-2 causes the Y-polarized divided light input from the PBS 30 and the other bifurcated light component input from PBS 32 to have a phase difference of 90 degrees and outputs the Y polarization and the bifurcated light component to the O/Es 34-3 and 34-4.

The O/Es 34-1 through 34-4 converts signal light from the 90-degree hybrid 33 into an electrical signal and outputs the electrical signal to the ADCs 35-1 through 35-4. For example, the O/Es 34 of the illustrated example have a function for heterodyne detection or homodyne detection.

The ADCs 35-1 through 35-4 convert analog electrical signals from the O/Es 34 into digital signals. As a consequence, the ADC 35-1 outputs an X-polarized electric field real-axis component (XI) to the fixed amount compensator 2-1 of the distortion compensating apparatus 1; the ADC 35-2 outputs an X-polarized electric field imaginary-axis component (XQ) to the fixed amount compensator 3-1 of the distortion compensating apparatus 1; the ADC 35-3 outputs a Y-polarized electric field real-axis component (YI) to the fixed amount compensator 2-1 of the distortion compensating apparatus 1; and the ADC 35-4 outputs a Y-polarized electric field imaginary-axis component (YQ) to the fixed amount compensator 3-1 of the distortion compensating apparatus 1.

Upon receipt of the electric field real-axis components and the electric field imaginary-axis components from the ADCs, the distortion compensating apparatus 1 compensates for distortion, such as wavelength dispersion, in a waveform of signal light through the above-described procedure, and then reproduces and outputs the compensated data.

The distortion compensating apparatus 1 can be applied to an optical receiving apparatus 40 that adopts a coherent receiving scheme, for example. It is therefore possible to reduce the hardware scale of the optical receiving apparatus 40.

The above description assumes that the distortion compensating apparatus 1 of this example is included in the optical receiving apparatus 40 having a polarized light diversity configuration having 90-degree hybrids 33 and O/Es 34 are doubled in number. But, as an alternative, an optical receiving apparatus 40A that adopts a scheme of receiving single polarized light may be used.

Figure 9:
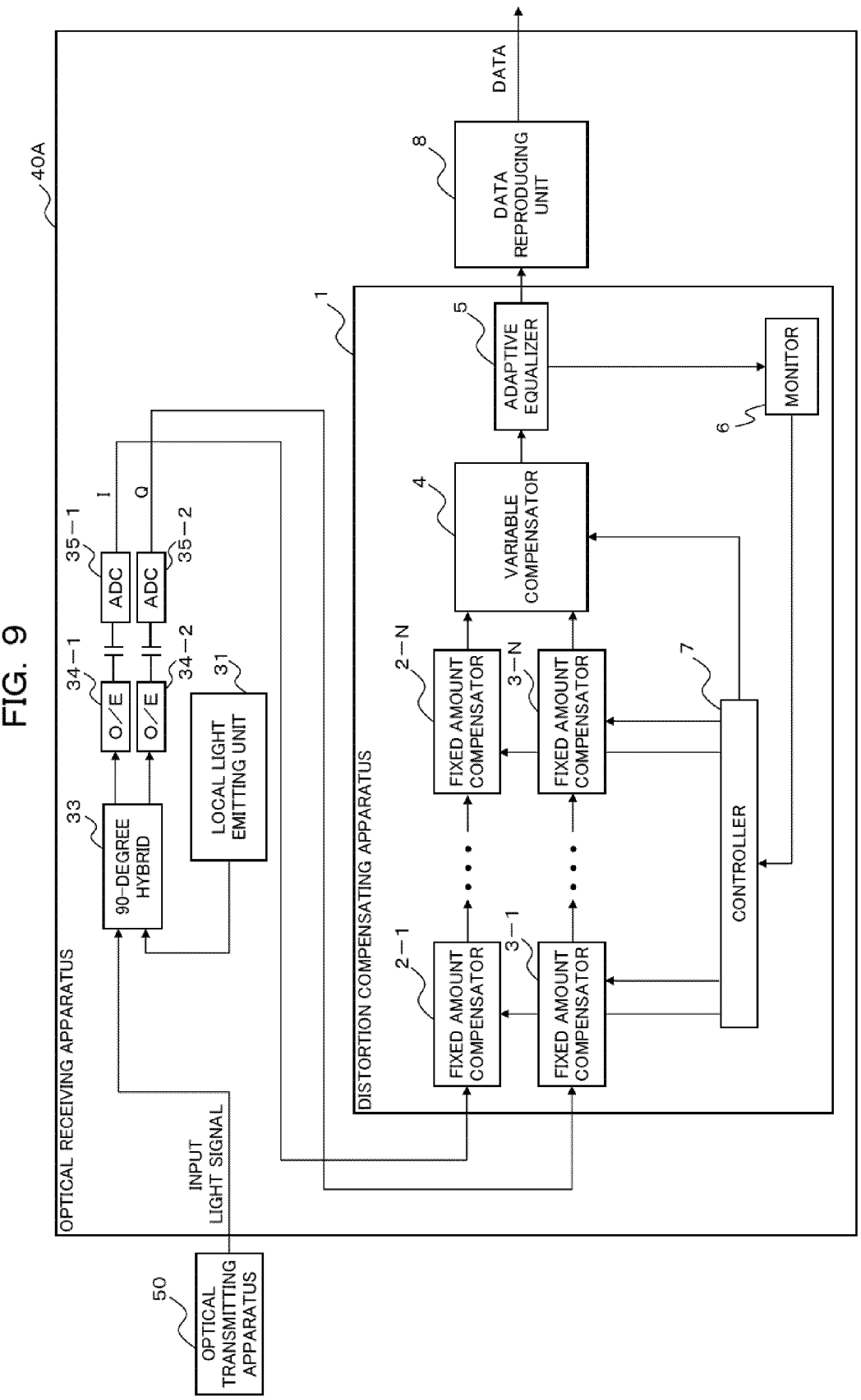
FIG. 9 is a block diagram schematically illustrating another example of an optical transmitting and receiving system including the distortion compensating apparatus of FIG. 1.

FIG. 9 depicts an example of an optical transmitting and receiving system including the distortion compensating apparatus 1 of the illustrated example.

The optical transmitting and receiving system of FIG. 9 includes the optical transmitting apparatus 50 and the optical receiving apparatus 40A which adopts a scheme of receiving single polarized light.

Here, the optical receiving apparatus 40A exemplarily includes a local light emitting unit 31, a 90-degree hybrid 33, O/Es 34-1 and 34-2, ADCs 35-1 and 35-2, and the distortion compensating apparatus 1.

The local light emitting unit 31 is semiconductor laser that oscillates at the same frequency as or a different frequency from that of the input signal light. The locally emitted light from the local light emitting unit 31 is output to the 90-degree hybrid 33.

The 90-degree hybrid 33 causes an input signal light input from the optical transmitting apparatus 50 through the optical transmission path and the locally emitted light from the local light emitting unit 31 to have a phase difference of 90 degrees and outputs the input signal light and the locally emitted light to the O/Es 34-1 and 34-2.

The O/Es 34-1 and 34-2 convert the signal light from the 90-degree hybrid 33 into an electrical signal, and outputs the electrical signal to the ADCs 35-1 and 35-2. For example, the O/Es of the present example have a function of heterodyne detection or homodyne detection.

The ADCs 35-1 and 35-2 convert analog electrical signals from the O/E 34 to digital signals. As a consequence, the ADC 35-1 outputs an electric field real-axis component (I) of the input signal light to the fixed amount compensator 2-1 of the distortion compensating apparatus 1 and the ADC 35-2 outputs the electric field imaginary-axis component (Q) of the input signal light to the fixed amount compensator 3-1 of the distortion compensating apparatus 1.

Upon receipt of the electric field real-axis component and the electric field imaginary-axis component from ADCs, the distortion compensating apparatus 1 compensates for distortion, such as wavelength dispersion, in a waveform of signal light through the above-described procedure, and then reproduces and outputs the compensated data.

As described above, the distortion compensating apparatus 1 can also be applied to the optical receiving apparatus 40A which adopts a scheme of receiving single polarized light. Also in this application, it is possible to reduce the hardware scale of the optical receiving apparatus 40A.

[2] First Modification

In the above distortion compensating apparatus 1, each of the fixed amount compensators 2 and 3 has a single kind of dispersion compensating amount (i.e., a single kind of filter coefficient). In the distortion compensating apparatus 1A of this modification, the dispersion compensating amount of each of the fixed amount compensators 2 and 3 is selected (switched) from a number of kinds of dispersion compensating amount.

Figure 10:
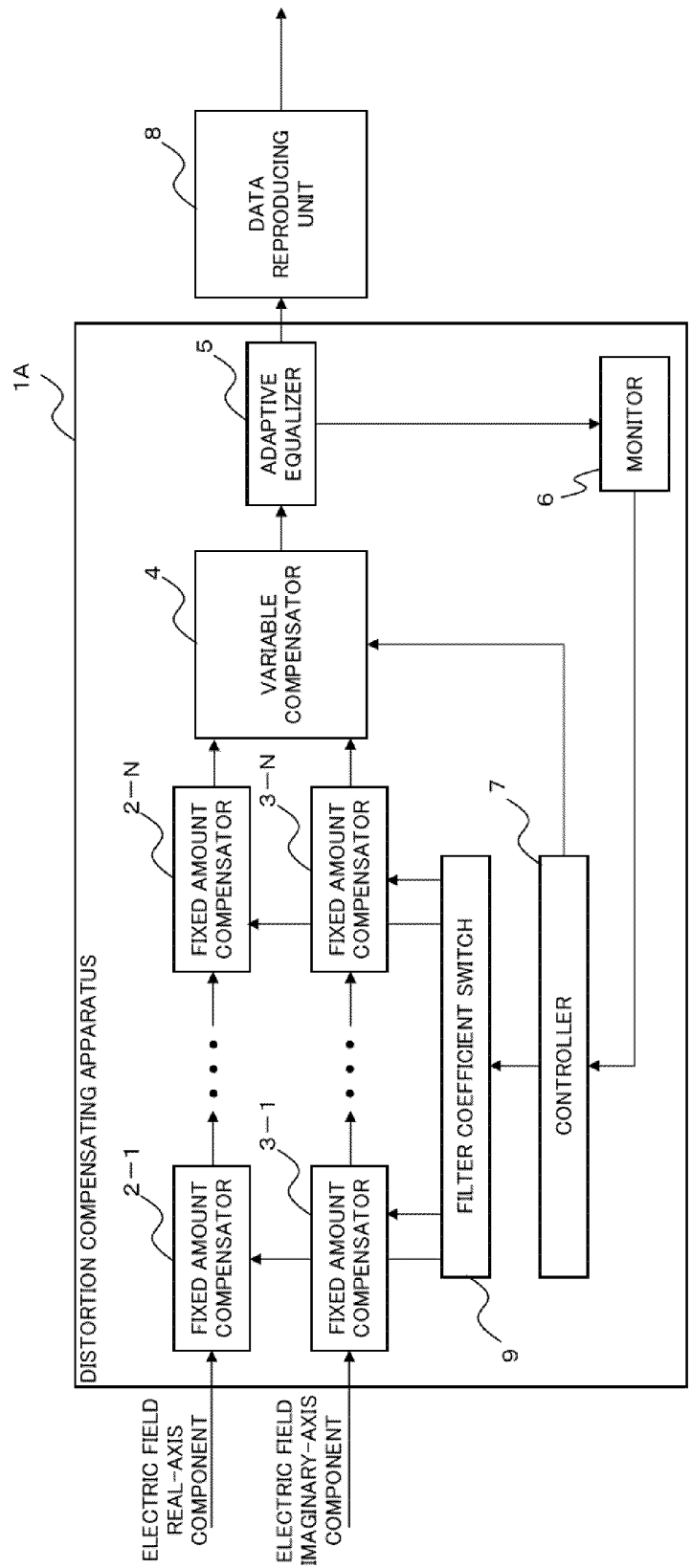
FIG. 10 is a block diagram schematically illustrating an example of a distortion compensating apparatus according to a first modification.

FIG. 10 is a block diagram schematically illustrating an example of the configuration of the distortion compensating apparatus 1A of this example. The distortion compensating apparatus 1A of FIG. 10 exemplarily includes fixed amount compensators 2-1 through 2-N and 3-1 through 3-N, a variable compensator 4, an adaptive equalizer 5, a monitor 6, a controller 7, and a filter coefficient switch 9.

Here, the fixed amount compensators 2-1 through 2-N and 3-1 through 3-N, the variable compensator 4, the adaptive equalizer 5, the monitor 6, the controller 7, and the data reproducing unit 8 are same in function as those illustrated in FIG. 1.

Each fixed amount compensator 2 includes a digital filter 22A having a number of kinds of coefficient pattern (filter coefficient).

The filter coefficient switch 9 selects one filter coefficient from a number of filter coefficients possessed by the digital filters 22A (switches a filter coefficient).

The method of switching a filter coefficient of this modification will now be described with reference to FIG. 11.

Figure 11:
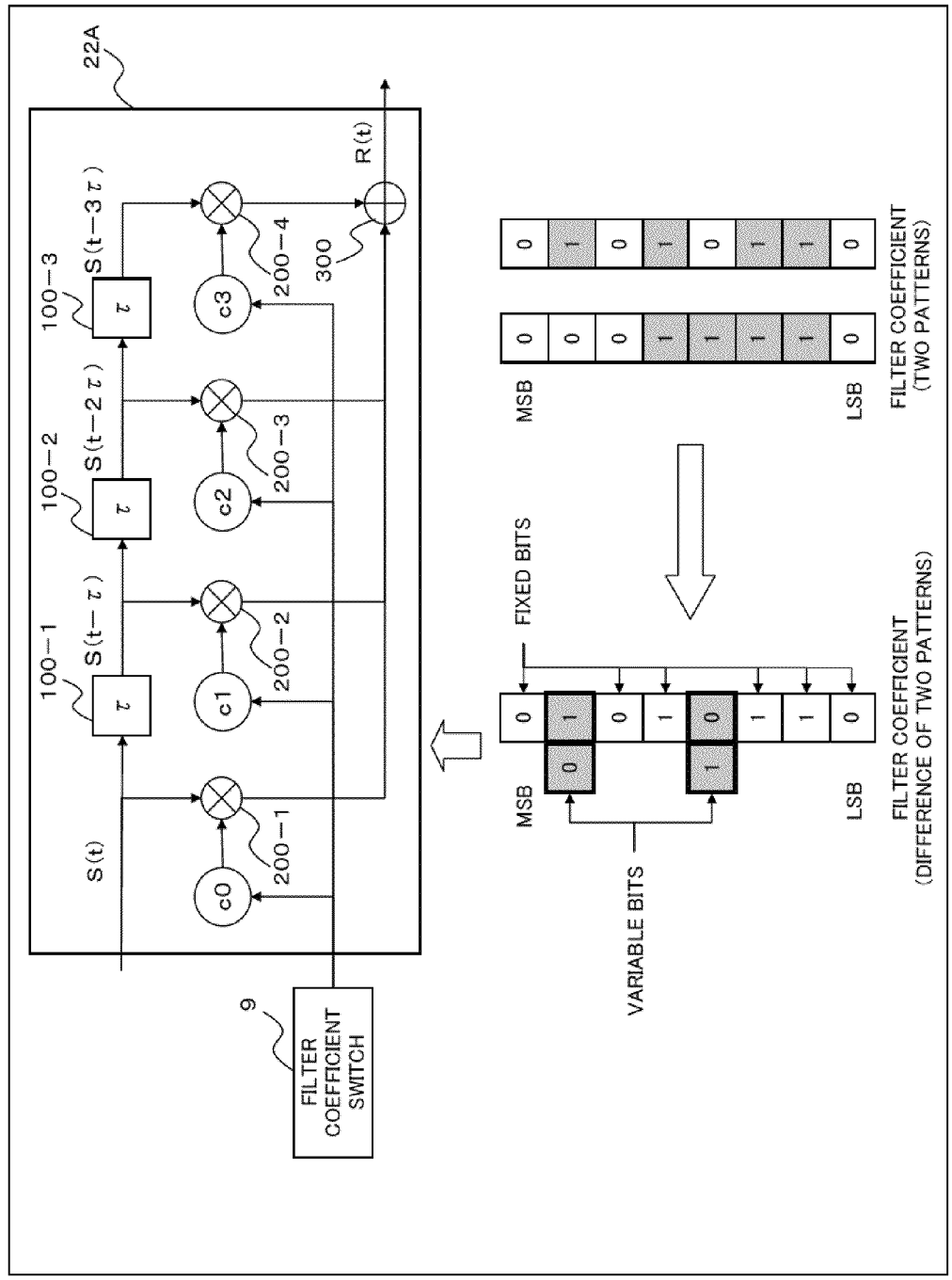
FIG. 11 is a diagram denoting a method of switching a filter coefficient of a fixed amount compensator of FIG. 10.

The digital filter 22A of FIG. 11 exemplarily includes delay circuits 100-1 through 100-3, multiplexer 200-1 through 200-4, and an adder 300, which are same in function as those illustrated in FIG. 2.

The following description assumes that the digital filter 22A has filter coefficients "01111000" and "01101010".

Since the bit strings of the two filter coefficients are the same except for the fourth bit and the seventh bit, switching between the two filter coefficients can be accomplished by a configuration in which the fourth bit and the seventh bit are set to be variable while the remaining bits are set to be fixed.

Therefore, this example switches the values of the two variable bits and thereby allows a single digital filter 22A to have a number of patterns of compensating amounts. The presence of the fixed bits makes it possible to reduce the circuit size as compared with the cases where a variable filter is used, and consequently the hardware scale of the fixed amount compensator 2 (3) can be reduced.

Further, the example of FIG. 11 assumes that the digital filter 22A possesses two patterns of filter coefficients, but the digital filter 22A may alternatively have more than two filter coefficient patterns. In this case, if the filter coefficient patterns have at least one fixed bit, the circuit scale can be reduced as compared with a variable filter having filter coefficient same in bit number. Such a configuration allows a single fixed amount compensator 2(3) to realize a number of dispersion compensating amounts classified into, for example, "no" dispersion compensation, "small" dispersion compensation, "medium" dispersion compensation, and "large" dispersion compensation.

The distortion compensating apparatus 1A of this example can ensure the same effects of the foregoing example, further improving the capability of dispersion compensation.

[3] Second Modification

The above distortion compensating apparatuses 1 and 1A compensate for wavelength dispersion in a light signal through the operation performed by the fixed amount compensators 2 and 3 and the variable compensator 4. In contrast, a distortion compensating apparatus 1B of this example can compensate for non-linear distortion in a light signal.

Figure 12:
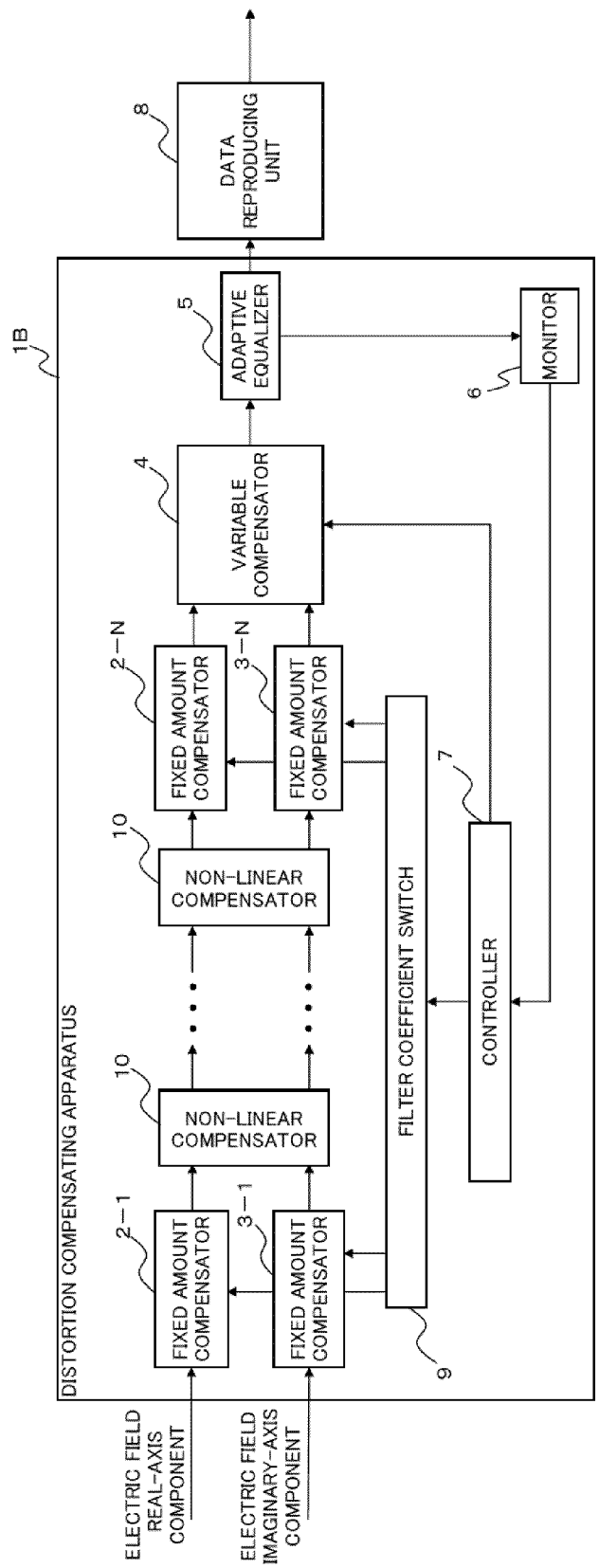
FIG. 12 is a block diagram schematically illustrating an example of a distortion compensating apparatus according to a second modification.

FIG. 12 is a block diagram schematically illustrating an example of the configuration of the distortion compensating apparatus 1B of this modification. The distortion compensating apparatus 1B of FIG. 12 exemplarily includes fixed amount compensators 2-1 through 2-N and 3-1 through 3-N, a variable compensator 4, an adaptive equalizer 5, a monitor 6, a controller 7, a filter coefficient switch 9, and non-linear compensators 10.

Here, the fixed amount compensators 2-1 through 2-N and 3-1 through 3-N, the variable compensator 4, the adaptive equalizer 5, the monitor 6, the controller 7, the data reproducing unit 8, and the filter coefficient switch 9 are same in function as those illustrated in FIG. 10.

The non-linear compensators 10 compensate for non-linear distortion in a light signal from an optical transmission path (not illustrated). The non-linear compensators 10 may be alternately cascaded with the fixed amount compensators 2 and 3 as illustrated in FIG. 12.

With this configuration, the distortion compensating apparatus 1B of this example can compensate for wavelength dispersion in a light signal and concurrently compensate for non-linear distortion in the light signal. As an alternative, the distortion compensating apparatus 1B may include one or more other devices, such as compensators, in addition to or as substitutes for the non-linear compensators 10.

As described above, the distortion compensating apparatus 1B of this example can ensure the same effects of the foregoing first embodiment and first modification, further compensating for non-linear distortion in a light signal.

[4] Others

The elements included in and the processes performed in the above distortion compensating apparatuses 1, 1A, and 1B can be partially discarded and/or combined according to the requirements.

In the above examples, at least one fixed amount compensator 2(3) and the variable compensator 4 are cascaded in this order, but the position of the variable compensator 4 and the number of variable compensators 4 may be modified. For example, the variable compensator 4 may be disposed ahead of the fixed amount compensators 2(3), or a number of variable compensators 4 may be alternated with blocks including one (or more) fixed amount compensators 2(3).

The distortion compensating apparatus 1 and the optical receiving apparatus 40 (40A) may be applied to optical communication systems adopting various modulations, such as DPSK (Differential Phase Shift Keying), QPSK (Quadrature Phase Shift Keying), SPSK (Symmetric Phase Shift Keying), and 16QAM (16 Quadrature Amplitude Modulation.

Further, the distortion compensating apparatus 1 and the optical receiving apparatus 40 (40A) may be applied to optical communication systems of the above modulation methods using polarized multiplexed light signals.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) has (have) been described in detail, it should be understood that the various changes, substitutions, and alterations could be made hereto without departing from the spirit and scope of the invention.

What is claimed is:

1. A distortion compensating apparatus for compensating for distortion in a waveform of a received light signal through digital signal processing, the distortion compensating apparatus comprising:
    a plurality of fixed amount compensators which compensate for the distortion in the waveform at respective given compensating amounts, wherein a combination of operating states of the plurality of fixed amount compensators is changed by on/off switching of each of the plurality of fixed amount compensators; and
    a controller which controls the on/off switching and thereby changes the combination, based on the distortion in the waveform caused by an optical transmission path through which the received light signal propagates,
    wherein the plurality of fixed amount compensators are cascaded,
    wherein each of the plurality of fixed amount compensators has coefficient patterns including an off coefficient pattern that makes the each of the plurality of fixed amount compensators switched off, and
    wherein the controller switches the operating state of each of the plurality of fixed amount compensators by selecting a coefficient pattern except the off coefficient pattern when each of the plurality of fixed amount compensators is switched on, and selecting the off coefficient pattern when each of the plurality of fixed amount compensators is switched off.

2. The distortion compensating apparatus according to claim 1, further comprising a variable compensator which compensates for the distortion in the waveform at a variable compensating amount, wherein
    the plurality of fixed amount compensators and the variable compensator are cascaded.

3. The distortion compensating apparatus according to claim 1, wherein the distortion in the waveform is caused by wavelength dispersion of the received light signal.

4. The distortion compensating apparatus according to claim 1, further comprising non-linear compensators which are alternately cascaded with the plurality of fixed amount compensators.

5. The distortion compensating apparatus according to claim 2, wherein the controller variably controls the variable compensating amount of the variable compensator based on the distortion in the waveform and a total compensating amount of operating fixed amount compensators.

6. The distortion compensating apparatus according to claim 2, wherein the plurality of fixed amount compensators and the variable compensator each include a digital filter which multiplexes an input signal and a coefficient pattern.

7. The distortion compensating apparatus according to claim 6, wherein the digital filter is a finite impulse response filter or an infinite impulse response filter.

8. A distortion compensating apparatus for compensating for distortion in a waveform of a received light signal through digital signal processing, the distortion compensating apparatus comprising:
    a plurality of fixed amount compensators which compensate for the distortion in the waveform at respective given compensating amounts, wherein a combination of operating states of the plurality of fixed amount compensators is changed by on/off switching of each of the plurality of fixed amount compensators;
    a variable compensator which compensates for the distortion in the waveform at a variable compensating amount; and
    a controller which controls the on/off switching and thereby changes the combination, based on the distortion in the waveform caused by an optical transmission path through which the received light signal propagates,
    wherein the plurality of fixed amount compensators are cascaded,
    wherein the plurality of fixed amount compensators and the variable compensator are cascaded, and wherein each of the plurality of fixed amount compensators comprises:
    an input-end switch which selectively switches between a first output and a second output of an input signal;
    a digital filter which inputs therein the first output of the input-end switch and which compensates for the distortion in the waveform of the first output at the given compensating amount; and
    a delay processor which inputs therein the second output of the input-end switch and which performs delay processing on the second output; and
    an output-end switch which selectively outputs either the first output compensated by the digital filter or the second output performed the delay processing by the delay processor, wherein
    the controller switches between the input-end switch and the output-end switch so that the first output compensated by the digital filter is outputted when each of the plurality of fixed amount compensators is switched on, and so that the second output performed the delay processing by the delay processor is outputted when each of the plurality of fixed amount compensators is switched off.

9. The distortion compensating apparatus according to claim 1, wherein each of the plurality of fixed amount compensators comprises a sign controller which inverts a plus or minus of the given compensating amount of each of the plurality of fixed amount compensators.

10. A distortion compensating apparatus for compensating for distortion in a waveform of a received light signal through digital signal processing, the distortion compensating apparatus comprising:
    a plurality of fixed amount compensators which compensate for the distortion in the waveform at respective given compensating amounts,
    wherein a combination of operating states of the plurality of fixed amount compensators is changed by on/off switching of each of the plurality of fixed amount compensators,
    wherein the plurality of fixed amount compensators are cascaded, wherein each of the plurality of fixed amount compensators comprises a sign controller which inverts a plus or minus of the given compensating amount of each of the plurality of fixed amount compensators, and wherein the sign controller keeps the sign of an imaginary component of a complex signal inputted into and outputted from each of the plurality of fixed amount compensators when the given compensating amount of each of the plurality of fixed amount compensators is a plus value, and inverts the sign of the imaginary component of the complex signal when the given compensating amount of each of the plurality of fixed amount compensators is a minus value.

11. An optical receiving apparatus comprising a distortion compensating apparatus for compensating for distortion in a waveform of a received light signal through digital signal processing, the distortion compensating apparatus comprising a plurality of fixed amount compensators which compensate for the distortion in the waveform at respective given compensating amounts, wherein a combination of operating states of the plurality of fixed amount compensators is changed by on/off switching of each of the plurality of fixed amount compensators; and a controller which controls the on/off switching and thereby changes the combination, based on the distortion in the waveform caused by an optical transmission path through which the received light signal propagates, wherein the plurality of fixed amount compensators are cascaded, wherein each of the plurality of fixed amount compensators has coefficient patterns including an off coefficient pattern that makes the each of the plurality of fixed amount compensators switched off, and wherein the controller switches the operating state of each of the plurality of fixed amount compensators by selecting a coefficient pattern except the off coefficient pattern when each of the plurality of fixed amount compensators is switched on, and selecting the off coefficient pattern when each of the plurality of fixed amount compensators is switched off.

12. An optical transmitting and receiving system comprising a distortion compensating apparatus for compensating for distortion in a waveform of a received light signal through digital signal processing, the distortion compensating apparatus comprising a plurality of fixed amount compensators which compensate for the distortion in the waveform at respective given compensating amounts, wherein a combination of operating states of the plurality of fixed amount compensators is changed by on/off switching of each of the plurality of fixed amount compensators; and a controller which controls the on/off switching and thereby changes the combination, based on the distortion in the waveform caused by an optical transmission path through which the received light signal propagates, wherein the plurality of fixed amount compensators are cascaded, wherein each of the plurality of fixed amount compensators has coefficient patterns including an off coefficient pattern that makes the each of the plurality of fixed amount compensators switched off, and wherein the controller switches the operating state of each of the plurality of fixed amount compensators by selecting a coefficient pattern except the off coefficient pattern when each of the plurality of fixed amount compensators is switched on, and selecting the off coefficient pattern when each of the plurality of fixed amount compensators is switched off.

* * * * *